United States Patent [19]

Flager

[11] 4,429,915
[45] Feb. 7, 1984

[54] BICYCLE SEAT

[76] Inventor: Calvin D. Flager, 23102 64th Ave. W., Mountlake Terrace, Wash. 98043

[21] Appl. No.: 243,314

[22] Filed: Mar. 13, 1981

[51] Int. Cl.³ .............................................. B62J 1/26
[52] U.S. Cl. .................................. 297/199; 297/214; 297/195
[58] Field of Search ............... 297/195, 199, 200, 214

[56] References Cited

U.S. PATENT DOCUMENTS

| 545,224 | 8/1895 | Eddy . | |
|---|---|---|---|
| 554,337 | 2/1896 | Dodds et al. . | |
| 569,326 | 10/1896 | Drury et al. | 297/199 |
| 569,796 | 10/1896 | Myers | 297/199 |
| 576,192 | 2/1897 | Hoyt . | |
| 588,039 | 8/1897 | Upson et al. . | |
| 591,330 | 10/1897 | Downes . | |
| 604,347 | 5/1898 | Bray . | |
| 618,240 | 1/1899 | Smith . | |
| 643,046 | 2/1900 | Drury et al. | 297/199 |
| 694,875 | 3/1902 | Meighan . | |
| 4,063,775 | 12/1977 | Meisinger . | |
| 4,218,090 | 2/1978 | Hoffacker et al. . | |

FOREIGN PATENT DOCUMENTS

| 6193 | of 1890 | United Kingdom | 297/199 |
|---|---|---|---|
| 9330 | of 1896 | United Kingdom | 297/199 |
| 17353 | of 1896 | United Kingdom | 297/199 |
| 691540 | 5/1953 | United Kingdom | 297/199 |

Primary Examiner—Francis K. Zugel
Assistant Examiner—Peter A. Aschenbrenner
Attorney, Agent, or Firm—Henderson & Sturm

[57] ABSTRACT

The invention relates to bicycle seats, particularly for racing or long-range touring. Rider comfort and fit to the bicycle is a problem of long standing. A seat assembly (13) provides an elevated region (11c) and a sloping area (11b), contacted by the rider's ischial tuberosities and pubic symphysis respectively, which encourages proper posture and enhances rider comfort. Adjustable tube (52), inserts (55, 56, 61, 67), and sling (46) further fit the rider to the seat and bicycle.

10 Claims, 10 Drawing Figures

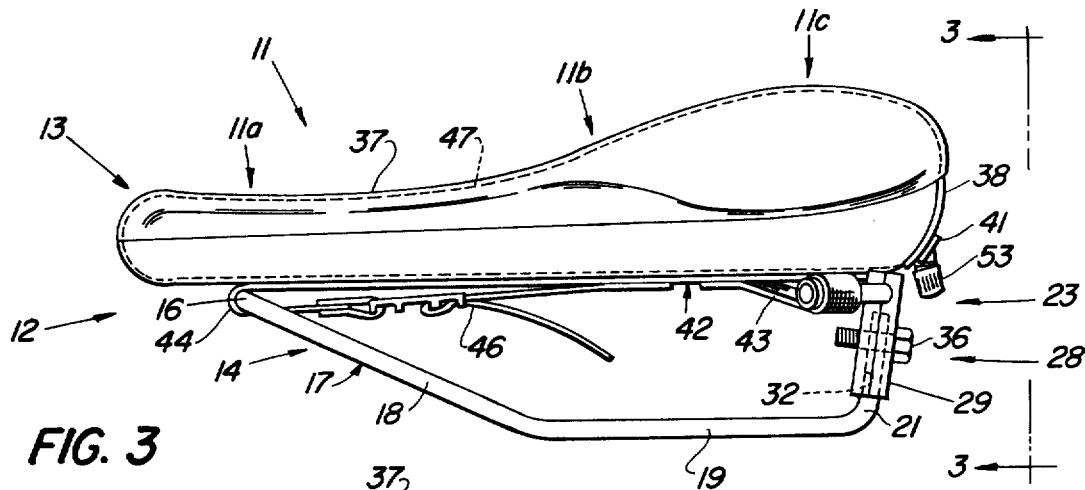
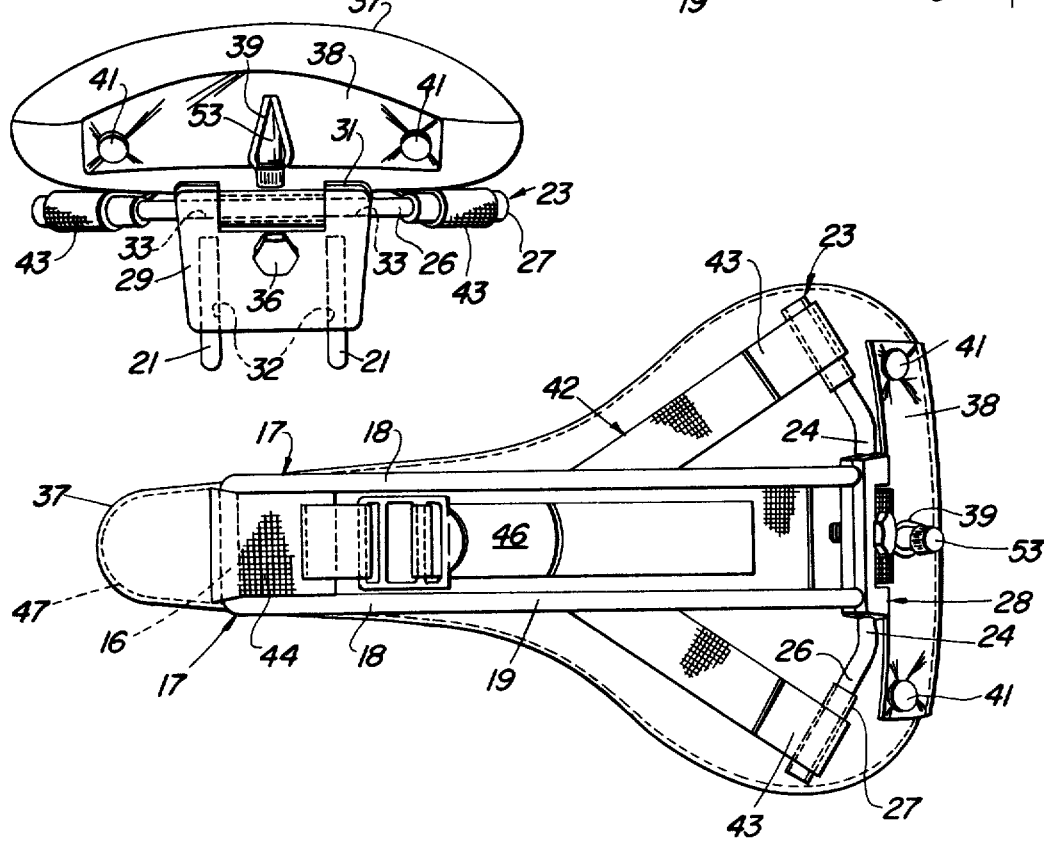

4,429,915

BICYCLE SEAT

TECHNICAL FIELD

This invention relates to seats. More particularly, the invention is concerned with seats which are adjustable and which are employed with bicycles, especially touring and racing type bicycles, and the like.

BACKGROUND ART

Discomfort of bicycle riders is a problem of long standing, beginning with the original wooden seats and extending through various leather and padded seats, some of them supported by various spring arrangements. The problem is most acute today in the case of the racing and long-range touring bicycles, having lightweight frames and, usually, a plurality of individually selectable driving gear ratios. A number of seats have been developed employing a pair of cushions each of which supports beneath an ischial tuberosity of the rider. These seats leave a number of problems unresolved.

DISCLOSURE OF INVENTION

This invention provides a bicycle seat having support and seat assemblies. The support includes clamped together a bracket and a rear support rod. The bracket attaches to the bicycle or the like.

The seat assembly includes an outside casing bearing a web. The bracket and rear support rod are engaged by the web. A pneumatic tube surrounds a foam member, both of which are encased by a second casing member. An outside pocket is provided on the second casing for receiving selected foam inserts. The second casing member, together with any insert, fits within the outside casing.

When assembled, the bicycle seat provides a narrow pommel, an intermediate sloping area, and an elevated rear main weight bearing area. Variable inflation of the tube and selection of inserts fit the seat to the rider.

An object of this invention is to provide an improved bicycle seat.

Another object of this invention is to provide a bicycle seat with greater comfort and performance, increased durability, and ease of maintenance.

More particularly, it is an object to provide for improved maintenance by development of a component seat readily assembled and disassembled to maximize access to individual parts.

Also an object is provision of a bicycle seat wherein components more susceptible to wear are more effectively shielded from friction and secured against excess movement.

A further object is provision of a bicycle seat having more precise adjustment capabilities.

Yet another object is development of a bicycle seat which more effectively distributes the weight of the rider, thereby increasing rider comfort.

An additional object is provision of a bicycle seat which urges the rider to assume a more efficient posture.

These objects and other features and advantages of this invention of a bicycle seat will become readily apparent upon referring to the following description and appended drawings.

BRIEF DESCRIPTION OF THE DRAWINGS

This invention of a bicycle seat is illustrated in the drawings wherein:

FIG. 1 is a side elevational view of the bicycle seat;

FIG. 2 is a bottom plan view of the bicycle seat more clearly showing the support assembly thereof;

FIG. 3 is a rear end elevation of the bicycle seat taken in the direction of line 3—3 in FIG. 1;

BEST MODE FOR CARRYING OUT THE INVENTION

Figure 4:
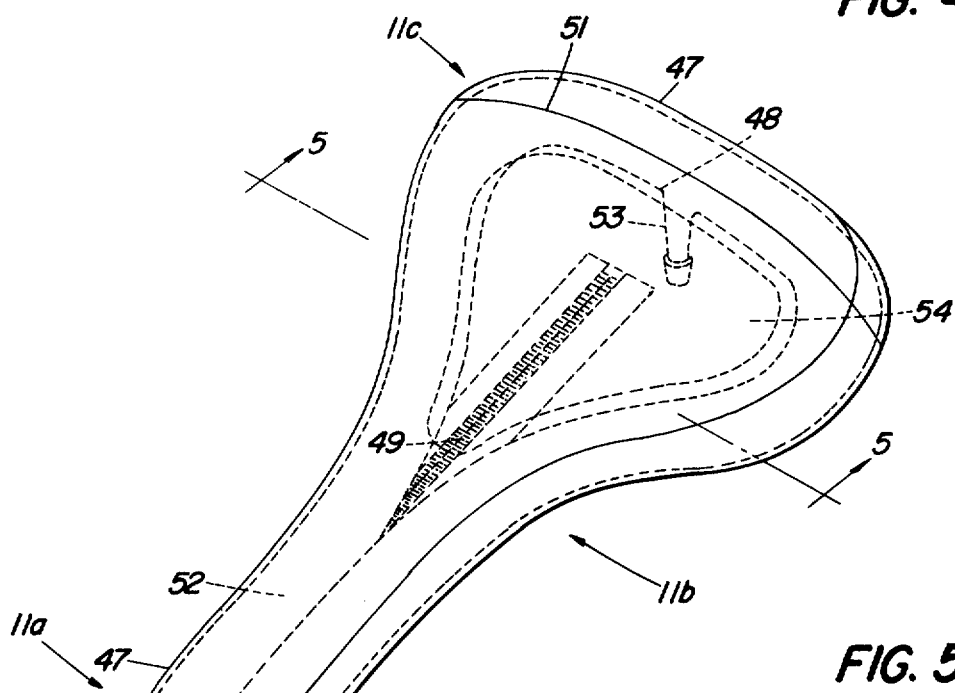
FIG. 4 is a perspective view of the seat assembly with the outer casing removed.

The bicycle seat invention is indicated generally at 11 in FIG. 1. The bicycle seat 11 includes a narrow pommel area 11a, a sloping pubic symphysis contact area 11b, and an elevated rear, ischial tuberosities contact area 11c. More particularly, the bicycle seat 11 includes a support assembly 12 and a seat assembly 13.

The support assembly 12 includes a support bracket 14 generally U-shaped in configuration (FIGS. 2 and 4). The bracket 14 is unitary, including a forward, transverse member 16 extending between longitudinal members 17 disposed side-by-side. Each member 17 has a front portion 18 rearwardly depending from member 16, an elongated middle portion 19 extending from portion 18, and a rear portion 21 extending upward from portion 19.

The support 12 also includes a rear transverse support rod 23. The rod 23 has a mid-portion 24. Bent arms 26 extend from both ends of mid-portion 24. A plastic covering 27, which may be a sleeve or may be formed as by dipping rod 23, is disposed over each arm 26.

The support 12 further includes a clamp 28 having identical front and rear halves. Each clamp 28 half includes a longitudinally elongated body 29. A pair of ears 31 extend upwardly from the body 29 and are spaced apart, each disposed at one end of the body 29. Beginning adjacent each ear 31, and spaced from and extending generally parallel to the end of the body 29, a groove or half bore 32 is formed in the face of the body 29. A groove or half bore 33 is formed into the face of each ear 31, the grooves 33 being parallel to the long axis of the body 29. A bore 34 is formed through each body 29 between the half bores 32.

A connecting bolt 36 is threaded through the aligned central bores 34 to draw the bodies 29 together, the clamp 28 halves being then secured by a locking nut or the like (not shown) disposed on the bolt 36. The surfaces bearing the aforementioned grooves are facing such that full bores 32, 33 are formed when the clamp 28 is assembled. Prior to assembling clamp 28, the bracket 14 is positioned such that each rear upright portion 21 is disposed within a body bore 32, and the support rod 23 is positioned such that mid-portion 24 is borne by aligned ear bores 33.

The seat assembly 13 (FIGS. 2 and 3) includes an exterior casing 37, formed preferably from a flexible, coated rip stop nylon. The casing 27 includes a rear flap 38 having a central aperture 39. The flap 38 is fastened closed as by snaps 41.

A web 42 is fixed to the underside of casing 37. The web 42 extends into a plurality of loops 43 formed adjacent the rear of casing 37. Toward the front, the web 42 has a length 44 extending free from the casing 37. An adjustable sling 46 connects the length 44 to the rear portion of the web 42.

Prior to the aforementioned assembly of the clamp 28, the bracket 14 is positioned such that the length 44 loops against and under transverse member 16. Also, the rear support rod 23 is positioned such that each arm 26 and the mid-portion 24 are received by one of the web loops 43.

Figure 5:
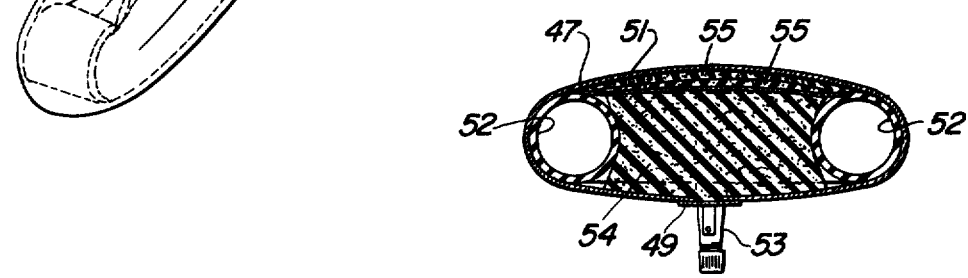
FIG. 5 is a cross-sectional view taken along line 5—5 of FIG. 4.
Figure 6:
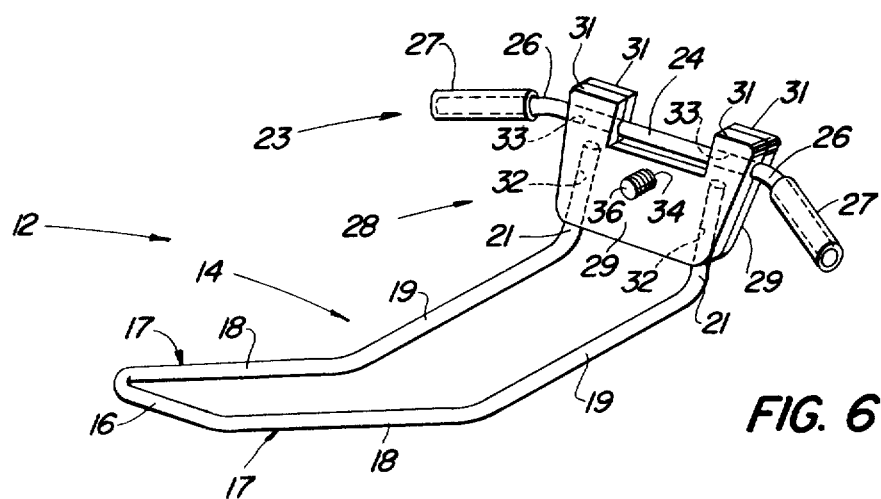
FIG. 6 is a perspective view of the support assembly.

The seat assembly 13 (FIGS. 4 and 5) also includes an internal casing 47 of a flexible, coated rip stop nylon. The casing 47 has a rear aperture 48 and an underside, longitudinal zipper structure 49. A pouch 51 is formed on the top of the casing 47 and opens to the rear. A pneumatic tube 52 is disposed within the casing 47, the valve stem 53 extending through aperture 48. A foam member 54 also is placed within casing 47 such that the tube 52 extends around the member 54. The zipper 49 is closed once the tube 52 and member 54 are positioned. The internal casing 47 fits into the outside casing 37 through the opening closed by flap 38. The valve stem 53 extends through aperture 39 when the flap 38 is closed.

Figure 7A:
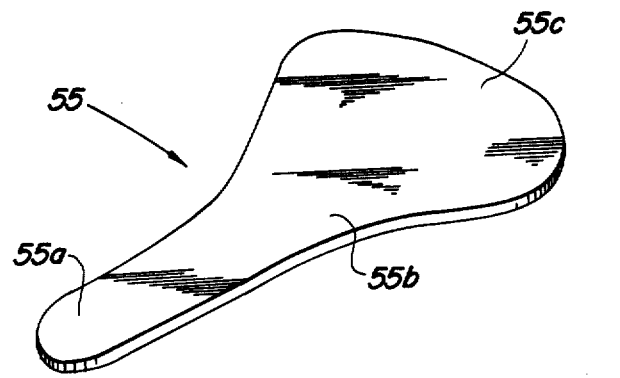
FIG. 7A is a perspective view of a first insert.
Figure 7B:
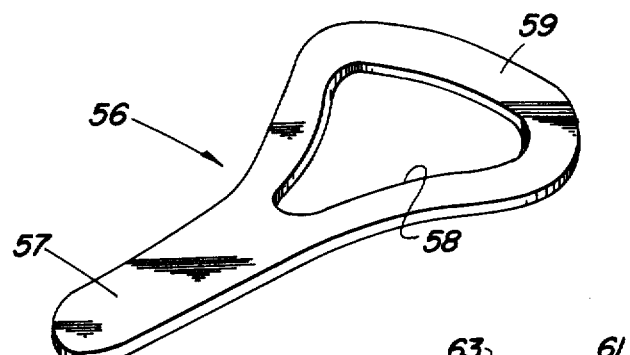
FIG. 7B is a perspective view of a second insert.

A flat, foam insert 55 (FIG. 7A) may be placed in the pocket 51 of internal casing 47. The insert 55 includes a forward, narrow pommel area 55a, a widening intermediate area 55b, and a broad rear area 55c.

An alternate insert 56, also flat and made of foam, may be placed in pocket 51. The insert 56 includes a pommel area 57, an intermediate area having a cut out 58, and a rear area 59.

Figure 7C:
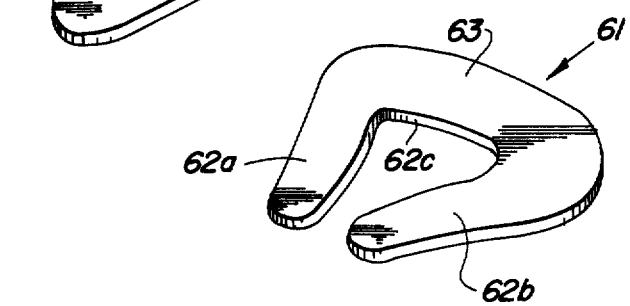
FIG. 7C is a perspective view of a third insert.

A third insert 61, again flat and made from foam, is shown in FIG. 7C. Generally C-shaped in plan, the insert 61 includes intermediate projections 62a, 62b extending to each side of a notch 62c. A rear area 63 connects projections 62a, 62b.

Figure 7D:
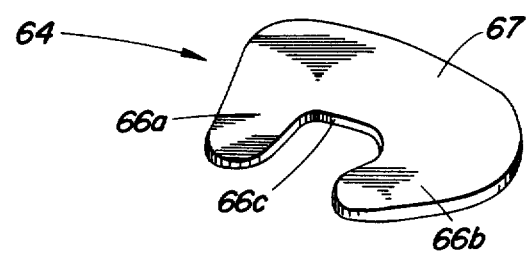
FIG. 7D is a perspective view of a fourth insert.

A fourth insert 64, similar to insert 61, is shown in FIG. 7D. Shortened intermediate projections 66a, 66b extend on each side of notch 66c. The rear area 67 joins the projections 66a, 66b.

The triangular member 54 and inserts 55, 56, 61, 64 are formed from a foam such as polyurethane, preferably in a variety of densities or hardnesses, by well known techniques. The components of the support assembly 12 are constructed from stamped steel and plated steel tubing.

When the bicycle seat 11 is used, air is pumped into the tube 52 through valve stem 53. The tube 52 presses against triangular member 54 and against the sides of the inner casing 47, thereby stretching taut the top and bottom of the casing 47. The tube 52 reacts off member 54 against the casing 47 sides; positioning of the tube 52 is guided by the member 54; and proper spacing of the portions of the tube 52 is maintained by the member 54, particularly at lower pressures.

The taut internal casing 47 in turn stretches taut the outside casing 37.

The casings 37, 47 are so formed that, when taut, the seat assembly 13 includes a front pommel 11a which is relatively long, approaching half the overall assembly 13 length, which has a narrow width, and which has a generally flat top surface (see FIG. 1). The pommel 11a extends into short, intermediate part 11b of gradually increasing width and having a sharply rising top surface (see FIG. 1). Part 11b extends into a rear, main weight bearing part 11c having a greatly increased width, an elevated, somewhat rounded top surface (see FIG. 1) and a length approaching half the overall assembly 13 length.

The seat assembly 13, viewed in plan, provides a relatively hard cushion in the pommel 11a, toward the sides of the intermediate region 11b, and about the periphery of the main support region 11c, as can be seen by observing the tube 52 in FIG. 4. A relatively softer cushion is provided by the foam member 54 in the intermediate region 11b, and particularly the main region 11c. The difference in hardness between the pommel 11a and the periphery of the rest of the seat 13 on the one hand, and the central area of region 11c above member 54, can be varied by adjusting the air pressure of the tube 52. Additional adjustment can be effected by insertion of one or more of the members 55, 56, 61, 64 into pocket 51 (two are shown employed in FIG. 5). The insert 55 will effect a uniform increase of hardness beneath substantially all of the top surface area of the seat 13. The remaining inserts 56, 61, 67 increase peripheral hardness with respect to the area above triangular member 54, particularly where more than one insert is employed. Addition of insert(s) also increases the slope of the top surface of intermediate region 11b and the elevation of the top surface of region 11c with respect to that of the pommel 11.

When the rider mounts the bicycle, most of the rider's body weight is borne, through the ischial tuberosities of the body, by the elevated back area 11c of the seat 13. The pubic symphysis of the rider's body contacts the sloping surface of the intermediate region 11b.

The tube 52 below region 11c supports the bulk of the rider's weight, and, as the tube 52 rapidly conforms to the rider's body, an extended period for breaking in the seat 13 is not required. The tube 52 furthermore acts to absorb road shocks, once the pressure in the tube 52 has been adjusted for the type of cycling being done. Rider comfort thereby is enhanced.

The elevation of region 11c and the sharp slope of intermediate region 11b encourages proper lower back curvature (lumbar lordotic curvature) such that the rider assumes a more efficient posture. The sloping contact area 11b, and the location of the relatively softer triangular member 54 below area 11b and the center of rear region 11c, greatly reduces irritation of the rider's body. When the rider pedals, his legs readily slide by the sides of intermediate area 11b. Narrowness of the pommel 11a minimizes instances of the rider's legs striking that end of the seat 13, thereby enhancing lateral stability of the seat 13 and overall rider comfort.

The aforementioned adjustment of the seat 13 by variation of tube 52 pressure and inserts 55, 56, 61, 64 further tunes the seat 13 to the rider to ensure the advantages of more efficient posture and greater rider comfort. The inserts 55, 56, 61, 64 in particular aid in distributing the load of the rider's weight from the region 11c through the rest of the seat 13 and particularly to the tube 52, and this also enhances durability of the bicycle seat 11.

The life of the tube 52 is enhanced because the spacer 54 reduces excess movement. The tube 52 is shielded further from the effects of friction by the casings 37, 47, as the outer casing 37 moves somewhat during cycling, but against casing 47, while the tube 52 remains relatively stationary with respect to inner casing 47.

The sling 46 tightens to reduce flexion of the pommel 11a, and to reduce rotation of the seat 13 about its longitudinal axis, due to alternating body weight distribution during pedaling by the rider. Stress is taken up by the transverse rod 23 and transverse member 16 and transmitted through the bracket 14 to the bicycle. The bracket 14 itself is clamped to the bicycle anywhere on the elongated middle portions 19, varying location of the bicycle seat 11 along the thoracic axis of the rider. Again, the fit of the rider to the bicycle is controlled more finely and comfort is enhanced. Should the tube 52 accidentally deflate, the sling 46 and web 42 provide tolerable support until repairs can be made.

Maintenance of the bicycle seat 11 is straightforward. Every component of the seat 11 can be reached readily. In particular, the flap 38 and zipper 49 provide quick access to the tube 52 and other internal structures.

The industrial applicability of the bicycle seat 11 is believed to be apparent from the foregoing. Although a preferred embodiment and modifications thereof have been disclosed, various alternate constructions can be made without departing from the full scope of the invention defined in the appended claims.

I claim:

1. A bicycle seat comprising:
   support means;
   seating means mounted on said support means and including pommel means, rear means for bearing weight, and intermediate means forming a slope and connecting said pommel means and said rear means;
   tube means of variable pressurization is disposed throughout said pommel means, rear means and intermediate means, and foam means is disposed in said rear means and extends into said intermediate means to form said slope, said tube means extending around said foam means, said tube and foam means being adjustable to provide support areas of contrasting hardness; and
   said rear means bearing weight of the rider transmitted through the rider's ischial tuberosities, said intermediate means bearing against the rider's pubic symphysis at said slope, said rear means and said intermediate means cooperating to urge proper low back curvature of the rider forward over said pommel means.

2. The bicycle seat of claim 1 and further wherein casing means encloses said tube and foam means.

3. The bicycle seat of claim 2 and further whrein said casing means includes a first casing enclosing said tube and foam means and having an exterior pocket.

4. The bicycle seat of claim 3 and further wherein an insert is disposed within said pocket.

5. The bicycle seat of claim 4 and further wherein said insert is comprised of foam substantially flat, having a relatively narrow pommel length, a relatively broad rear length, and a relatively short and tapering middle length connecting said pommel and rear lengths.

6. The bicycle seat of claim 5 and further wherein said insert has a cut out area extending from said rear length into said middle length.

7. The bicycle seat of claim 4 and further wherein said insert is comprised of foam length substantially flat and having projections extending from said length to form a notch.

8. The bicycle seat of claim 3 and further wherein a second casing encloses said first casing and is fixed to said support means.

9. The bicycle seat of claim 8 and further wherein a web is fixed to said second casing and includes loop means disposed below said rear means and a free length means disposed below said pommel means, said support means includes a support rod and bracket, said support rod is held by said loop means and said bracket is engaged at one end by said free length means and at the opposite end is attached to said support rod.

10. The bicycle seat of claim 9 and further wherein said bracket includes a transverse member engaged by said free length means, upright members attached to said support rod, and middle members extending from said transverse member to said upright members and providing means for attachment to a bicycle.

* * * * *